US012001232B2

(12) United States Patent
Mitev

(10) Patent No.: US 12,001,232 B2
(45) Date of Patent: Jun. 4, 2024

(54) GAIN LIMITER

(71) Applicant: Dialog Semiconductor (UK) Limited, London (GB)

(72) Inventor: Mityu Mitev, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 131 days.

(21) Appl. No.: 17/502,560

(22) Filed: Oct. 15, 2021

(65) Prior Publication Data

US 2023/0123393 A1 Apr. 20, 2023

(51) Int. Cl.
*G05F 1/575* (2006.01)

(52) U.S. Cl.
CPC .................................... *G05F 1/575* (2013.01)

(58) Field of Classification Search
CPC . G05F 1/575; G05F 1/59; G05F 1/595; G05F 1/569; G05F 1/571; G05F 1/573; G05F 1/56
See application file for complete search history.

(56) References Cited

U.S. PATENT DOCUMENTS 5,545,970 A 8/1996 Parkes, Jr. et al.
10,001,795 B2 6/2018 Jefremow et al.
2006/0055383 A1* 3/2006 Eberlein ................. G05F 1/575 323/280
2009/0322429 A1* 12/2009 Ivanov ................ H03F 3/45179 330/257
2015/0015331 A1 1/2015 Kronmueller
2015/0015332 A1 1/2015 Kronmueller
2015/0212530 A1* 7/2015 Forejtek .................. G05F 1/575 323/280
2015/0355653 A1 12/2015 Drebinger et al.
2020/0244160 A1 7/2020 Mitev

FOREIGN PATENT DOCUMENTS

DE 10 2015 216 493 A1 3/2017

OTHER PUBLICATIONS

German Office Action, File No. 10 2022 101 423.1, Applicant: Dialog Semiconductor (UK) Limited, dated May 31, 2022, 9 pages.

* cited by examiner

*Primary Examiner* — Nguyen Tran
(74) *Attorney, Agent, or Firm* — Sâile Ackerman LLC; Stephen B. Ackerman

(57) ABSTRACT

An LDO regulator for generating an output voltage at an output node of the LDO controller based on an input voltage received at an input node of the LDO controller is described. The LDO controller comprises a first amplifier stage, a driver stage, a second amplifier stage coupled between the drive stage and the output node, a feedback stage coupled between the output node and the first amplifier stage, and a gain limiter stage coupled between the first amplifier stage and the driver stage at an intermediate node for lowering a loop gain of the LDO regulator. A corresponding method for operating an LDO regulator is further described.

16 Claims, 5 Drawing Sheets

100

GAIN LIMITER

TECHNICAL FIELD

The present disclosure is generally directed to low dropout (LDO) regulator topologies, and more particularly to gain limiter topologies for use in the LDO regulators.

BACKGROUND

In the general technical field of low dropout (LDO) regulators, stabilization (which is sometimes also referred to as compensation) is an important part of the LDO design and aims to guarantee the LDO operation without self-oscillations of output voltage or current.

Broadly speaking, there exist two typical types of LDO topologies with compensation. One is generally referred to as a “Miller-like topology”, i.e., LDOs with an internal “Miller” compensation capacitor especially at light loads. The general principle of operation of such topology is generally to lower the gain of an intermediate amplification stage via feedback from the gate of the output power MOS device. The other type of topology generally makes use of a capacitor at the output of the LDO. A gain Limiter is generally considered to be an essential part of this particular type of LDO topology and the stabilization thereof.

Conventionally, most LDO designs generally utilize a negative feedback approach to gain maximum performance out of the used semiconductor technology. Therefore, stability of the negative feedback loop has to be ensured (i.e., the loop has to be compensated), for all external conditions (i.e., external to the LDO, like supply voltage variation, load current variation, temperature range, etc.) which may typically be defined or requested by the customer. Further, design for stable LDO operation based on a particular schematic topology may put limits for other LDO parameters that are also demanded by the customer.

However, sometimes the full set of the customer requirements may not be possible to meet even on several different LDO topologies. In such a case, either topology improvement needs to be found or compromise on requirements has to be agreed on.

SUMMARY

Thus, broadly speaking, the focus of the present disclosure is to propose techniques and/or topologies (e.g., LDO regulator techniques/topologies, and/or gain limiter techniques/topologies therein) for enabling LDO regulators with better LDO static load regulation (for the same phase margin), particularly for use in specific LDO designs (topologies), using an output capacitor as compensation.

In view of some or all of the above technical problems, the present disclosure generally provides low dropout (LDO) regulators, gain limiters for use in such LDO regulators, as well as corresponding operating methods, having the features of the respective independent claims.

According to an aspect of the disclosure, there is provided an LDO regulator (or sometimes also referred to as LDO for short) configured to generate (e.g., convert) an output voltage at an output node of the LDO regulator based on an input voltage received at an input node of the LDO regulator.

In particular, the LDO regulator may comprise a first amplifier (amplification) stage. The LDO regulator may further comprise a driver (driving) stage. The driver stage may for example be a gate driver stage or any other suitable driver stage, depending on the implementation. The LDO regulator may yet further comprise a second amplifier (amplification) stage being coupled (e.g., connected or directly coupled) between the driver stage and the output node. As will be understood and appreciated by the skilled person, the second amplifier stage may, but does not necessarily have to be, the same (e.g., of the same type) as the first amplifier stage. The LDO regulator may further comprise a feedback stage coupled (e.g., connected or directly coupled) between the output node and the first amplifier stage. Finally, the LDO regulator may comprise a gain limiter stage coupled (e.g., connected or directly coupled) between the first amplifier stage and the driver stage at an intermediate node. Specifically, the gain limiter stage may be configured for lowering a regulation loop gain (i.e., the gain of the regulation/regulating loop) of the LDO regulator. Of course, the LDO regulator may comprise further component(s) (elements, devices, etc.) that is/are suitable or necessary for implementing a complete LDO regulator. For instance, in some possible implementations, an output load (e.g., a resistive element) and an output capacitive element (e.g., a capacitor) may be coupled to the output node.

Configured as proposed above, the LDO regulator topologies of the present disclosure generally enable LDO regulators with better LDO static load regulation (for the same phase margin, PM for short), particularly for use in the specific LDO designs (topologies) where an output capacitor is used as compensation. Specifically, the proposed topologies may be considered to have higher efficiency because of their simplicity, and thus may be particularly suitable in applications where high efficiency is needed. Moreover, only minimum output capacitance is generally required to achieve a stable operation. An increase of output capacitance may generally improve the phase margin and the overall LDO performance, which in turn would allow easy adoption in applications with higher output capacitance without the necessity of re-design or re-simulation. In contrast, some of the conventional LDO topologies may only tolerate a certain range of output capacitance to stay stable, which in turn would make them more application-specific.

In some embodiments, the first amplifier stage may comprise an operational transconductance amplifier (OTA). Any other suitable amplifier topology may be adopted, depending on various implementations and/or requirements.

In some embodiments, the first amplifier stage may be configured to amplify a difference (voltage) between a reference voltage and a voltage that is indicative of the output voltage. The voltage indicative of the output voltage may be a (predefined) fraction of the output voltage, for example. The voltage indicative of the output voltage may be generated by the feedback stage of the LDO regulator as a feedback voltage.

In some embodiments, the amplified difference voltage (or sometimes also referred to as the “error” voltage) may be used for adjusting an output current of the second amplifier stage through the driver stage.

In some embodiments, the driver stage may comprise first and second switching elements (devices) coupled in series between the input node (i.e., being supplied by the input voltage) and a reference node. The reference node may be ground (GND), or any other suitable reference node (e.g., coupled to a suitable reference voltage), as will be understood and appreciated by the skilled person. Notably, any switching elements/devices mentioned throughout this disclosure may be transistor devices, such as FETs, MOSFETs, etc., or any other suitable switching devices, as will be understood and appreciated by the skilled person.

In some embodiments, the second amplifier stage may comprise a power switching element that is supplied by the input voltage at the input node. The power switching element may be a power MOSFET (or more specifically, a power p-channel MOSFET or PMOS for short), for example, depending on implementations and/or requirements.

In some embodiments, the first switching element of the driver stage and the power switching element of the second amplifier stage may form a current mirror (i.e., may be connected in a current-mirror configuration).

In some embodiments, the feedback stage may comprise a voltage divider. The voltage divider may comprise two resistors coupled (e.g., connected) in series, for example.

In some embodiments, the gain limiter stage may comprise a diode-connected switching element (e.g., a diode-connected MOSFET). For instance, in MOSFET applications, the gate and drain terminals of a MOSFET may be connected to form such a "diode-like" MOSFET, as will be understood and appreciated by the skilled person. Notably, configured as proposed, the diode-connected switching element may generally improve stability of the regulating loop, and as a result, worsen static load regulation of the LDO, which may be considered as an important LDO parameter in certain applications. Moreover, the diode-connected configuration implementing the gain limiter stage may also enable the designer (of the LDO) to trade-off between stability and static load regulation of the LDO, depending on implementations and/or requirements.

In some embodiments, the gain limiter stage may comprise first and second current mirrors. In particular, one branch of the first current mirror and one branch of the second current mirror may be coupled (e.g., connected) to the intermediate node that is arranged between the first amplifier stage and the driver stage. Similar to the diode-connected configuration, the current-mirror configuration implementing the gain limiter stage may also improve the (DC) gain of the regulation loop, and as a result, achieve a better static load regulation of the LDO while not affecting the stability. Moreover, compared to the above diode-connected configuration, the gain limiter topology using the current mirrors may generally provide more flexibility to the designer (of the LDO) to meet the customers' (sometimes controversial or conflicting) requirements. Yet further, this gain limiter topology using current mirrors may also depend less on technology limits (e.g., minimum transistor width, etc.), thereby further improving flexibility. To be more specific, the above proposed diode-connected switching element-based gain limiter generally "bonds" LDO stability and static load regulation. Technology limits (e.g., minimum transistor width, specific gate oxide capacitance, etc.) generally define a "strength" of this bonding relation, which may be broadly summarized as following: the better the stability, the worse the static load regulation, and vice versa. Particularly, due to technology limitations, the static load regulation may generally have a maximum limit, providing certain stability is achieved (i.e., aiming at a certain stability when designing the LDO will translate into an upper limit for the static load regulation that may be achievable). However, with the gain limiter topology proposed in this embodiment (i.e., a current-mirror-based gain limiter), the impact of technology limitations is reduced, loosening the aforementioned bond, which allows the designer to achieve better static load regulation meeting the same stability level.

In some embodiments, the first current mirror may have a current mirror ratio of 1, and the second current mirror may have a current mirror ratio of K. Particularly, in some possible implementations, K may have a value larger than 0, and less than or equal to 1 (i.e., $0<K\leq1$). However, in some other possible implementations, K may also have a value higher than 1. In any case, measurements (e.g., simulations) may have to be performed, in order not to adversely (negatively) affect the stability of the overall LDO, as will be understood and appreciated by the skilled person.

In some embodiments, the gain limiter stage may further comprise a capacitive element (e.g., a capacitor) coupled in parallel with a diode-connected switching element of the first current mirror.

In some embodiments, a capacitance of the capacitive element may be set such that a current of a diode-connected switching element of the second current mirror is partially (e.g., when $K<1$) or fully (e.g., when $K=1$) compensated at low frequency, and/or is not compensated at 0 dB gain frequency (sometimes also denoted as $f_{0dB}$).

That is to say, it is possible to select the capacitance of the capacitive element in such a way that at low frequencies the current diode-connected switching element of the second current mirror may be almost fully (e.g., partially or fully) compensated, but at the same time at about the 0 dB gain frequency compensation may be completely OFF. As such, the LDO can be kept stable, thereby improving static load regulation of the LDO without any loss of stability.

In some embodiments, the gain limiter stage may be configured to lower an effective impedance at the intermediate node such that a non-dominant pole frequency of the LDO regulator is increased. The non-dominant pole frequency may be allowed to increase together with (e.g., positively correlated with) a load current.

In some embodiments, the gain limiter stage may be configured to increase the load current such that the 0 dB gain frequency may also be increased together with the load current.

According to another aspect of the disclosure, there is provided a gain limiter for use in an LDO regulator. The LDO regulator may be implemented according to the preceding aspect and any possible embodiments or implementations thereof.

In particular, the gain limiter may comprise first and second current mirrors. One branch of the first current mirror and one branch of the second current mirror may be coupled (e.g., connected) or may be foreseen to be coupled to an intermediate node that is arranged between a first amplifier (amplification) stage and a driver (driving) stage of the LDO regulator. Specifically, the gain limiter may be configured for lowering a regulation loop gain (i.e., the gain of the regulation/regulating loop) of the LDO regulator.

Configured as proposed, the gain limiter of the present disclosure (specifically implemented by using the current-mirror configuration) may enable to improve the (DC) gain of the regulation loop of the LDO, and as a result, achieve a better static load regulation of the LDO while not affecting the stability thereof. Moreover, the gain limiter topology using the current mirrors may generally provide more flexibility to the designer (of the LDO) to meet the customers' (sometimes controversial or conflicting) requirements. Yet further, this gain limiter topology using current mirrors may also depend less on technology limits (e.g., minimum transistor width, etc.), thereby further improving flexibility. To be more specific, the above proposed diode-connected switching element-based gain limiter generally "bonds" LDO stability and static load regulation. Technology limits (e.g., minimum transistor width, specific gate oxide capacitance, etc.) generally define a "strength" of this boding relation, which may be broadly summarized as following:

the better the stability, the worse the static load regulation, and vice versa. Particularly, due to technology limitations, the static load regulation may generally have a maximum limit, providing certain stability is achieved (i.e., aiming at a certain stability when designing the LDO will translate into an upper limit for the static load regulation that may be achievable). However, with the gain limiter topology proposed in this aspect (i.e., a current-mirror-based), the impact of technology limitations is reduced, loosening the aforementioned bond, which allows the designer to achieve better static load regulation meeting the same stability level.

In some embodiments, the first current mirror may have a current mirror ratio of 1, and the second current mirror may have a current mirror ratio of K. Particularly, in some possible implementations, K may have a value larger than 0, and less than or equal to 1 (i.e., $0<K\leq1$). However, in some other possible implementations, K may also have a value higher than 1. In any case, measurements (e.g., simulations) may have to be performed, in order not to adversely (negatively) affect the stability of the overall LDO, as will be understood and appreciated by the skilled person.

In some embodiments, the gain limiter stage may further comprise a capacitive element (e.g., a capacitor) coupled in parallel with a diode-connected switching element of the first current mirror.

In some embodiments, a capacitance (capacitance value) of the capacitive element may be set such that a current of a diode-connected switching element of the second current mirror is partially (e.g., when $K<1$) or fully (e.g., when $K=1$) compensated at low frequency, and/or is not compensated at 0 dB gain frequency (sometimes also denoted as $f_{0dB}$). That is to say, it is possible to select the capacitance of the capacitive element in such a way that at low frequencies the current diode-connected switching element of the second current mirror may be almost fully (e.g., partially or fully) compensated, but at the same time at about the 0 dB gain frequency compensation may be completely OFF. As such, the LDO can be kept stable, thereby improving static load regulation of the LDO without any loss of stability.

According to yet another aspect of the present disclosure, there is provided a method for operating an LDO regulator being configured for generating (e.g., converting) an output voltage at an output node of the LDO regulator based on an input voltage received at an input node of the LDO regulator.

In particular, the method may comprise providing a first amplifier (amplification) stage. The method may further comprise providing a driver (driving) stage. The driver stage may for example be a gate driver stage or any other suitable driver stage, depending on implementations. The method may yet further comprise providing and/or coupling (e.g., connecting or directly coupling) a second amplifier (amplification) stage between the driver stage and the output node. As will be understood and appreciated by the skilled person, the second amplifier stage may, but does not necessarily have to be, the same (e.g., of the same kind or type) as the first amplifier stage. The method may also comprise providing and coupling (e.g., connecting or directly coupling) a feedback stage between the output node and the first amplifier stage. Finally, the method may comprise providing and/or coupling (e.g., connecting or directly coupling) a gain limiter stage between the first amplifier stage and the driver stage at an intermediate node (i.e., the intermediate node arranged between the first amplifier stage and the driver stage). More particularly, the gain limiter stage may be configured for lowering a regulation loop gain (i.e., the gain of the regulation/regulating loop) of the LDO regulator. Of course, as indicated above, the LDO regulator may comprise further component(s) (elements, devices, etc.) that is/are suitable or necessary for implementing a complete LDO regulator. For instance, in some possible implementations, an output load (e.g., a resistive element) and an output capacitive element (e.g., a capacitor) may be coupled to the output node.

Configured as proposed above, the LDO regulator topologies of the present disclosure may generally enable providing LDO regulators with better LDO static load regulation (for the same phase margin), particularly for use in specific LDO designs (topologies) where an output capacitor is used as compensation. Specifically, the proposed topologies may be considered to have higher efficiency because of their simplicity, and thus may be particularly suitable in applications where high efficiency is needed. Moreover, only minimum output capacitance is required for achieving stable operation. An increase of the output capacitance may generally improve phase margin and overall LDO performance, which in turn would allow easy adoption in application with higher output capacitance without the necessity of re-design or re-simulation. Some of the conventional LDO topologies, by contrast, may only tolerate a certain range of output capacitance to stay stable, which in turn would make them more application-specific.

Details of the disclosed method can be implemented as an apparatus (e.g., a power converter) adapted to execute some or all of the steps of the method, and vice versa, as the skilled person will appreciate. In particular, it is understood that methods according to the disclosure relate to methods of operating the circuits according to the above embodiments and variations thereof, and that respective statements made with regard to the circuits likewise apply to the corresponding methods, and vice versa.

It is also understood that in the present document, the term "couple" or "coupled" refers to elements being in electrical communication with each other, whether directly connected e.g., via wires, or in some other manner (e.g., indirectly). Notably, one example of being coupled is being connected.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of an LDO regulator topology according to an embodiment of the present disclosure, FIGS. 2A-2B schematically illustrate examples of gain limiter topologies according to embodiments of the present disclosure, FIG. 3 schematically illustrates an example of an LDO regulator topology according to another embodiment of the present disclosure, FIGS. 4A-4B schematically illustrate an example of simulation results of the LDO topologies of FIGS. 1 and 3 in comparison with that of a possible conventional LDO topology.

DETAILED DESCRIPTION

As indicated above, identical or like reference numbers in the present disclosure may, unless indicated otherwise, indicate identical or like elements, such that repeated description thereof may be omitted for reasons of conciseness. Also, any switching elements/devices mentioned in this disclosure may be transistor devices, such as MOSFETs, or any other suitable switching devices. In some of the figures the switching devices may be simplified, but they should be understood as the same or similar switching devices as shown in other figures.

As indicated above, in a broad sense, the present disclosure generally proposes techniques and/or topologies (e.g., LDO regulator techniques/topologies, and/or gain limiter techniques/topologies for LDO regulators) for enabling LDO regulators with better LDO static load regulation (at the same phase margin), particularly for use in specific LDO designs (topologies), with output capacitors as compensation.

Figure 1:
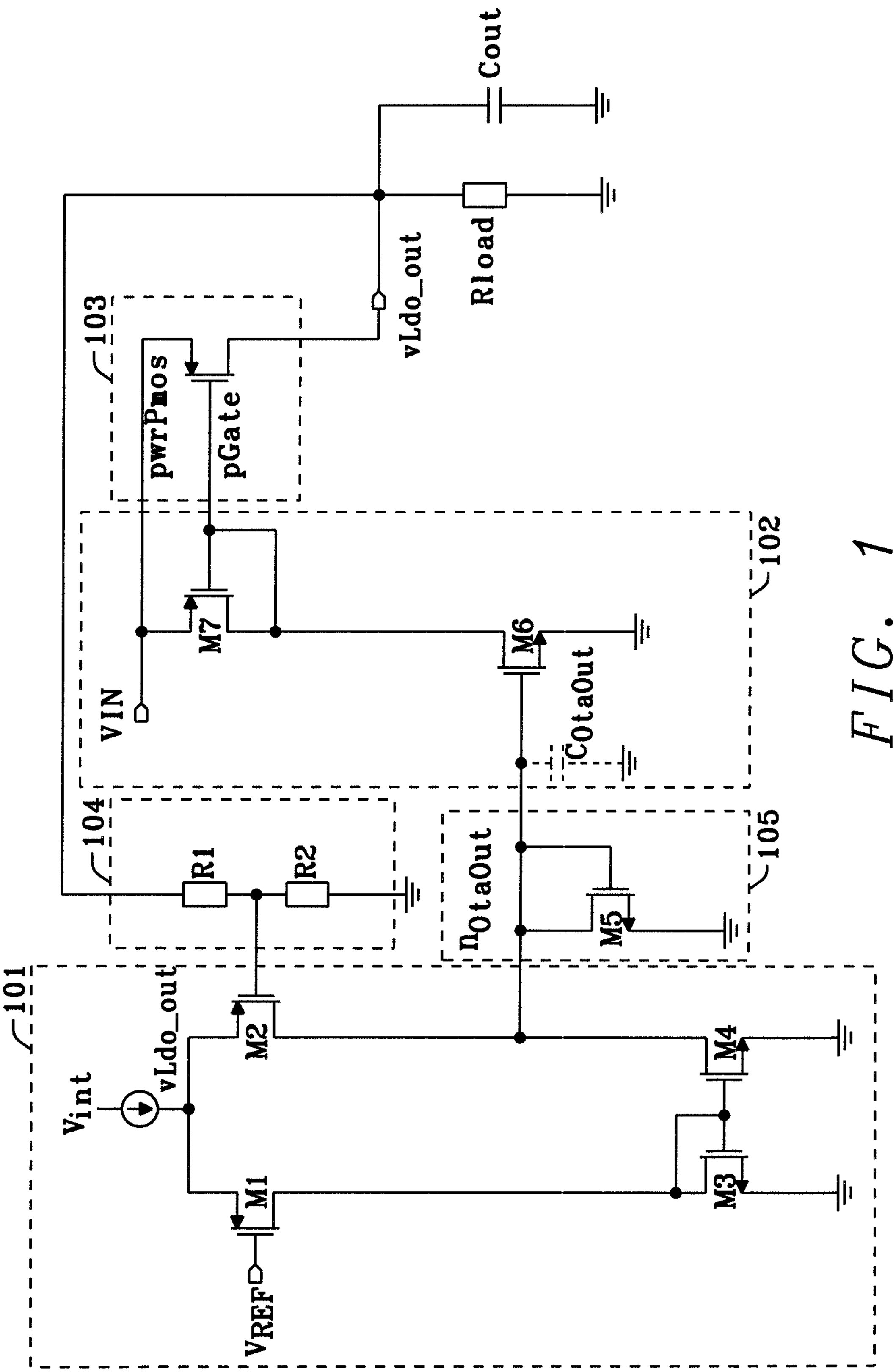

Now referring to the drawings, FIG. 1 schematically illustrates an example of an LDO regulator topology 100 according to an embodiment of the present disclosure.

Particularly, the LDO 100 as shown in FIG. 1 may be broadly seen as comprising a first amplifier stage 101. The first amplifier stage 101 may be implemented by any suitable means, for instance as an operational transconductance amplifier (OTA), as exemplified in FIG. 1.

The LDO 100 may further comprise a driver stage 102 implemented, in the example of FIG. 1, by two switching elements M6 and M7 coupled in series between the input voltage VIN (provided at an input node of the LDO regulator 100) and a reference node (e.g., the ground/GND or any other suitable reference node).

The LDO 100 may also comprise a second amplifier stage 103. The second amplifier stage 103 may be implemented in any suitable manner, for instance as simple as a power MOSFET, or more specifically as a power p-channel MOSFET (denoted as "pwrPmos" in FIG. 1) as exemplified in FIG. 1. In this sense, the driver stage 102 may also be referred to as a p-gate driver stage (denoted as "pGate" in FIG. 1). The second amplifier stage 103 is configured to generate an output voltage (denoted as "vLdo_out" in FIG. 1) at an output node of the LDO 100. In addition, there is also an output load $R_{load}$ and an output capacitive element $C_{out}$ coupled (e.g., connected) to the output node of the LOD 100.

The LDO 100 may yet further comprise a feedback stage 104, for instance implemented as simple as a voltage divider comprising resistors R1 and R2 as exemplified in FIG. 1, or in any other suitable manner.

Finally, according to embodiments of the disclosure, the LDO topology 100 may also comprise a gain limiter stage 105 coupled (e.g., connected) between the first amplifier stage 101 and the driver stage 102, specifically at an intermediate node (denoted as "$n_{OtaOut}$" in FIG. 1) that is arranged between the first amplifier stage 101 and the driver stage 102. In the specific example of FIG. 1, the gain limiter stage 105 is implemented as a diode-connected MOSFET M5, which will be described in more detail below.

Notably, the dashed capacitor $C_{OtaOut}$ presented at the intermediate node $n_{OtaOut}$ as shown in FIG. 1 may be considered to generally represent the overall (parasitic, or effective) capacitance at the output of the OTA 101, which may generally include, possibly among others, gate capacitances of switching elements M5 and M6, as will be understood and appreciated by the skilled person. Generally speaking, this capacitance $C_{OtaOut}$ may affect the LDO's stability performance, so that it may be necessary to kept it as small as possible in some possible implementations.

More specifically, in the example of FIG. 1, the first amplifier stage (or simply the OTA) 101 comprises switching elements M1-M4 (which may be implemented as MOS transistors as exemplified here, or in any other suitable form). A tail current source is connected to the source terminals of the input differential pair (i.e., comprising switches M1 and M2). The OTA 101 is configured to amplify the difference between the reference voltage $V_{REF}$ and the divided-down version of the LDO output voltage vLdo_out. This amplified "error" (or difference) voltage is then used to adjust the output current of the pwrPmos 103, particularly through the switching elements M6 and M7 of the gate driver 102.

Further, VIN may be the power supply of the LDO 100, which is generally understood to be regulated to the target voltage of the LDO 100 that is defined by $V_{REF}\times((R1+R2)/R2)$. The supply voltage VIN may be generated in any suitable manner, depending on implementations and/or requirements. For instance, in some possible implementations, VIN may be generated via a DC-DC power converter (e.g., a Boost power converter) and may be higher than the normal supply voltage of the (overall) integrated circuit (IC). In such a case, the generation of the supply voltage VIN may be understood to be somehow related to energy losses. LDO topologies in such application(s) may then be generally used to reduce output ripple, which may be considered inevitable for some of the DC-DC converter implementations.

However, for the sake of power efficiency, any current consumption from VIN that is not demanded from the external load may need to be minimized. That is one of the reasons why, in the present example of FIG. 1, only switching devices M7 and pwrPmos are (directly) connected to VIN. These two switching devices, i.e., M7 and pwrPmos generally form a current mirror. The current through M7, which goes directly to the reference node (e.g., ground/GND) may cause efficiency losses that need to be minimized. Therefore, in a broad sense, the higher width ratio between switching devices pwrPmos and M7 (forming the current mirror), the better the efficiency, as will be understood and appreciated by the skilled person. However, on the other hand, the width ratio cannot be set to be arbitrary high, simply because the pole (in the regulating feedback loop transfer function of the LDO) associated with the pGate node (of the switching element pwrPmos) may be considered to be harmful to stable operation of the entire LDO.

It may also be worthwhile to note that voltage Vint in the OTA 101 of the LDO 100 may be an internal voltage of the (whole) integrated circuit (IC). Depending on implementations, this voltage Vint may be derived from the main IC supply and may be smaller than the main supply in most cases. As is also shown in FIG. 1, Vint generally only supplies the OTA 101, and as a result, the current consumption may be relatively small for an "average" LDO specification, which helps for the overall efficiency.

Notably, the OTA 101 may generally have (relatively) high impedance output at the intermediate node $n_{OtaOut}$ (which may also be the node to which drain terminals of switches M2 and M4 are coupled). Such high impedance output, when combined with $C_{OtaOut}$ may however result in the pole (in the loop transfer function) having frequency reasonably below the 0 dB gain frequency (which is sometimes also referred to or denoted as $f_{0dB}$), which, in some possible cases may be harmful to stability. Therefore, this pole should generally be controlled/implemented to have a higher frequency than that of the pole at the LDO output. However, as will be understood and appreciated by the skilled person, this does not necessarily have to be always the case. Because of the expected higher frequency, sometimes this pole is also referred to as "non-dominant".

In view thereof, measures for keeping the frequency of this "non-dominant" pole high may be generally needed. In the example of FIG. 1, this is generally achieved via the diode-connected switching element M5.

Broadly speaking, the diode-connected switching element M5 may be configured to lower the effective impedance at the $n_{OtaOut}$ node, and as a result, increase the non-dominant pole frequency. This may in turn further improve the overall stability of the LDO 100. Moreover, M5 may also help to lower the gain of the regulating loop over the whole frequency range, for example from 0 Hz to frequencies well above $f_{0dB}$. As can be understood and appreciated by the skilled person, this (i.e., lowering the regulation loop gain) is also the reason for the name "gain limiter". In addition, it is to be noted that this diode connection of M5 may also allow the non-dominant pole frequency to increase together with the load current (e.g., positively correlated with the load current). This is considered to be an important feature because $f_{0dB}$ of the regulating loop may also increase with the load current.

It is further to be noted that, by controlling (designing) the size of M5, it is generally possible to perform a tradeoff between the DC loop gain (which is considered to be responsible for the DC accuracy of the output voltage or the static load regulation) and stability (in other words, the phase margin of the regulation loop).

To summarize, the LDO regulator topology 100 as proposed may generally allow providing LDO regulators with better LDO static load regulation (for the same phase margin), particularly for use in specific LDO designs (topologies) where an output capacitor is used as compensation. Specifically, the proposed topology 100 may be considered to have higher efficiency because of its simplicity, and thus may be particularly suitable for applications where high efficiency is needed. Moreover, only minimum output capacitance is generally required to achieve stable operation. An increase of the output capacitance may generally improve the phase margin and the overall LDO performance, which in turn would allow easy adoption in applications with higher output capacitance, without necessity of re-design or re-simulation. By contrast, some of the conventional LDO topologies, however, may only tolerate a certain range of output capacitance to stay stable, which in turn would make them more application-specific.

Furthermore, in the proposed LDO topology 100 the output capacitor $C_{out}$ can be understood to play a key role not only for stability but also for other important LDO parameters, such as transient load response. For very fast transient loads, semiconductor electronics support output capacitors in delivering power, but the main power delivery may come from the capacitor.

However, it may also be understood that simplicity of topology may, under certain circumstances, lead to poorer static load regulation. Moreover, since the required impedance at the OTA output (i.e., at node $n_{OtaOut}$) is generally high, the switching element M5 may often be implemented as comprising a number of serially connected narrow (that is, the width may always be set to the minimum allowable by the technology used) and long devices in practice. As can be understood and appreciated by the skilled person, generally speaking, the minimum width may be used to define the total device length needed. As a result, gate capacitance in such M5 implementation may not be avoided, and thus may harm stability. That way, the minimum M5 width (which, as illustrated above, is generally defined by the technology) may be considered to limit the overall LDO performance in terms of stability and static load regulation. Specifically, high stability generally leads to poor static load regulation and vice versa.

In view of the above issues, further LDO topologies (particularly further gain limiter topologies for use in LDO topologies) are presently proposed, which will now be described in more detail below with reference to FIGS. 2A, 2B, and 3. In short, the main idea of the topologies in FIGS. 2A, 2B, and 3 that can be generalized is the shaping of OTA load impedance over frequency, seeking to achieve the aim of particular LDO type performance improvements, but without harming stability. As will become apparent in view of the below description, this aim is generally achieved with the help of current mirroring (switching devices M5*gl*-M2*gl* and M3*gl*-M4*gl* as shown in FIGS. 2A and 2B) and the introduction of $C_{TrnOff}$ (as shown in FIGS. 2A and 2B) for precise adjustment of the gain limiter's impedance over frequency.

Figure 2B:
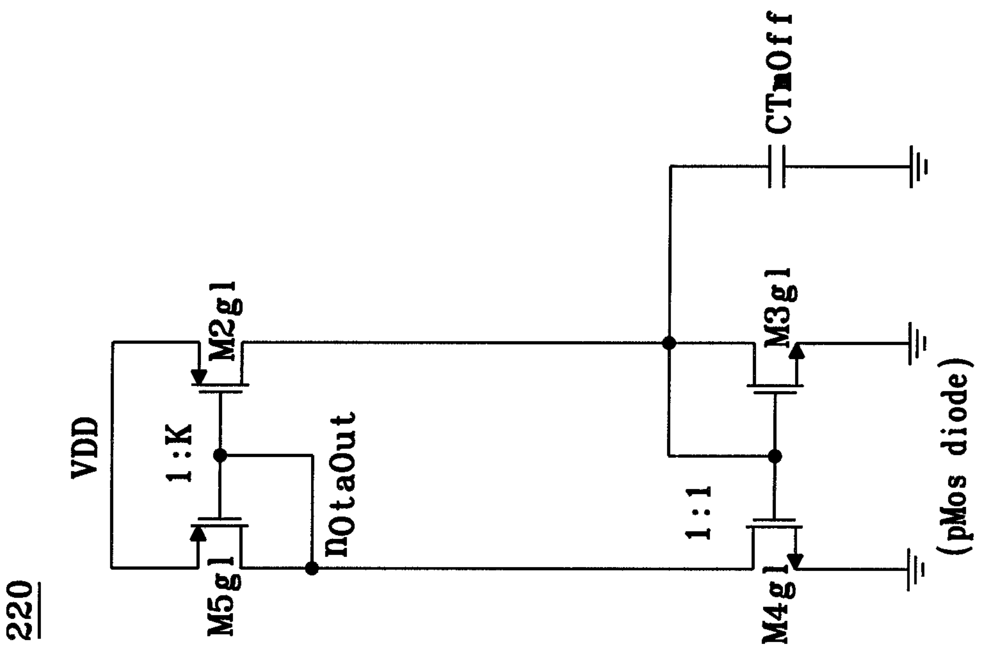
Figure 2A:
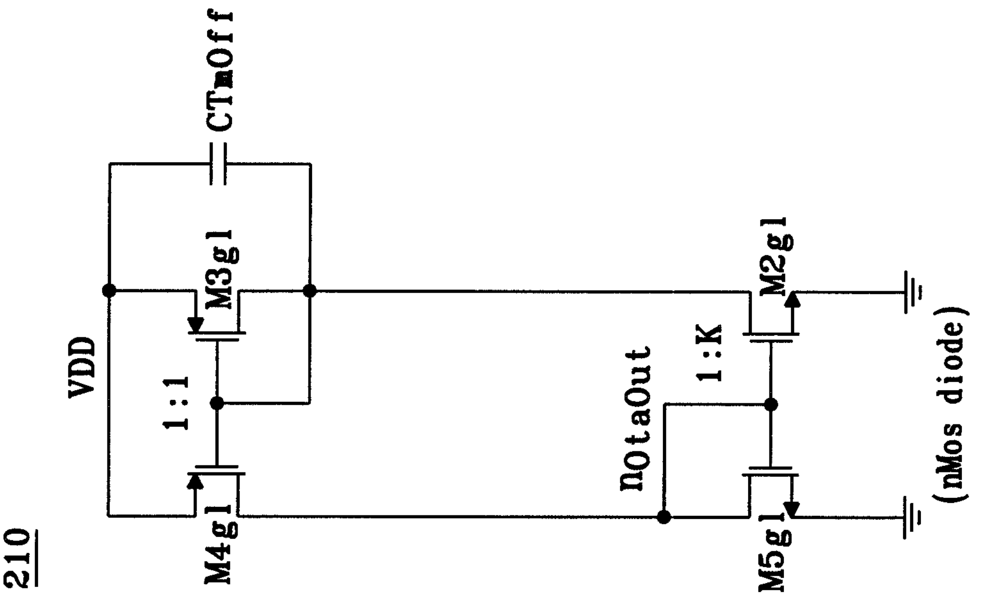

Specifically, as can be seen from FIGS. 2A and 2B, two different (but similar) implementations of the gain limiter are proposed, which correspond to NMOS-diode-connection-based (FIG. 2A, denoted as "nMos diode") and PMOS-diode-connection-based (FIG. 2B, denoted as "pMos diode") implementations, respectively. Particularly, the terms "nMos diode" and "pMos diode" used here are generally to refer to the switching device M5*gl* in both figures, which is configured as a diode-connected NMOS and a diode-connected PMOS, respectively. However, it should be understood that it may be the proposed topology as a whole (i.e., comprising all switching devices M2*gl*-M5*gl*) in either FIG. 2A or 2B that is used to replace the diode-connected switch M5 from FIG. 1, in order to serve/act as the necessary "gain limiter" for the LDO. Furthermore, the OTA output, i.e., node $n_{OtaOut}$ from FIG. 1 is understood to be connected to the same $n_{OtaOut}$ node in the schematic gain limiter of FIG. 2A or 2B.

Broadly speaking, the main idea behind the proposed topologies of FIGS. 2A and 2B is to compensate the unavoidable DC current through the switching element M5*gl*. As mentioned earlier, this DC current is generally considered as the main reason for the lower static load regulation. In addition, the M5*gl* current compensation may also allow designing this switching device (i.e., comprising a number of serially connected narrow and long devices as illustrated above) to be (relatively) short, thereby reducing the parasitic gate capacitance (the dashed $C_{OtaOut}$ as shown in FIG. 1) at the $n_{OtaOut}$ node. As a result, higher impedance at the $n_{OtaOut}$ node is now achievable with shorter devices that also have smaller gate capacitances.

To be more specific, as can be seen from either FIG. 2A or 2B, the proposed gain limiter 210 or 220 generally uses two current mirrors, namely M5*gl*-M2*gl* and M3*gl*-M4*gl*, to fully (with K=1) or partially (with 0<K<1) compensate the DC current through M5*gl*. Notably, the value of parameter "K" is generally used to refer to the current mirror ratio and is thus always positive. More particularly, K is influenced by the mismatch in the current mirrors (i.e., the M5*gl*-M2*gl* and M3*gl*-M4*gl* pairs), and thus, values for K derived from a particular design may be different from that derived for other design specifications. Generally speaking, for K<1, the input impedance would be positive (e.g., an increase of $n_{OtaOut}$ potential would increase overall input current flowing into that node); while for K>1, the input impedance would become negative.

As indicated above, in some possible implementations, "K" may also be a value higher than 1, but it is to be noted that this may have negative impact on the stability performance of the LDO in certain scenarios. For instance, for 1<K<1.1, the DC Loop gain may become even bigger than the DC gain without gain limiter, but the Bode plots may become more difficult to interpret. In that case, the stability of the LDO may have to be judged by using Nyquist plots, instead of the commonly adopted approach. For K>1.5, the gain limiter may start to strongly affect the regulating loop operation, instead of lowering the output voltage error. In that case, errors in the LDO output may start to increase. Therefore, more extensive stability simulations may need to be performed in such cases. For instance, in some possible implementations, K may be simulated with Monte Carlo simulations so that the circuit designer may be able to investigate random K variation. In any case, it is generally advisable to choose a design with K being smaller than 1 (i.e., in the range between 0 and 1), particularly at a sufficient confidence level (e.g., bigger than 3σ).

Relatively low M5*gl* impedance (compared to that of a bare OTA output impedance) would be needed at high frequency in order to lower the overall AC loop gain and to guarantee stability of the entire LDO.

Therefore, in order to achieve such gain limiter impedance variation over frequency, a capacitive element $C_{TrnOff}$ may generally be introduced and placed in parallel with the switch M3*gl* of the current mirror, as shown in the examples of FIGS. 2A and 2B. Specifically, for frequencies of about $g_{M3gl}/C_{Trnoff}$ (where $g_{M3gl}$ generally represents the transconductance of M3*gl*), current compensation for the switch M5*gl* may start to drop, because $C_{TrnOff}$ generally starts to short the AC current of the switch M2*gl*. In that sense, it may be generally possible to select $C_{Trnoff}$ in such a way that at low frequencies the current of the switch M5*gl* is almost fully compensated; while at the same time, at about $f_{0dB}$ the compensation is completely OFF, so that the LDO can be kept as stable as possible. Thereby, the static load regulation of the whole LDO may be improved by about 2-3 times without any loss of stability, which is the goal of the proposal(s) of the present disclosure.

To summarize, the main advantage of the above-proposed gain limiter structures as shown in the examples of FIGS. 2A and 2B may be increased input impedance at low frequencies and thus increased overall feedback/regulating loop gain for low frequencies. As a result, the static load regulation is also improved for the same stability (phase margin). Moreover, compared to the diode-connected switch M5 of FIG. 1, the gain limiter topologies as proposed in the example of FIGS. 2A and 2B are also less affected by technology limitations of minimum achievable MOS widths.

Incidentally, it may be worthwhile to note that, as will be understood and appreciated by the skilled person, the gain limiter topology with the "pMos diode" as shown in the example of FIG. 2B may be generally considered to be not suitable for direct use in the LDO topology 100 of FIG. 1. This is mainly for the reason that the increase of the load current (at the output of LDO 100 in FIG. 1) would decrease the transconductance of the switch M5*gl*, which would then worsen the overall stability of LDO 100 from FIG. 1 (if the gain limiter topology of FIG. 2B were to be directly applied thereto).

However, if LDO regulation with negative voltage regulation is still needed for example in some possible implementations, it may still be possible to re-use the LDO topology 100 from FIG. 1, but by building the OTA 101 with NMOS input differential pair, swapping M6 with a PMOS device, M7 and pwrPmos with NMOS devices. Thereby, the "pMos diode"-based gain limiter from FIG. 2B could be used together with this (modified) LDO topology from FIG. 1.

Figure 3:
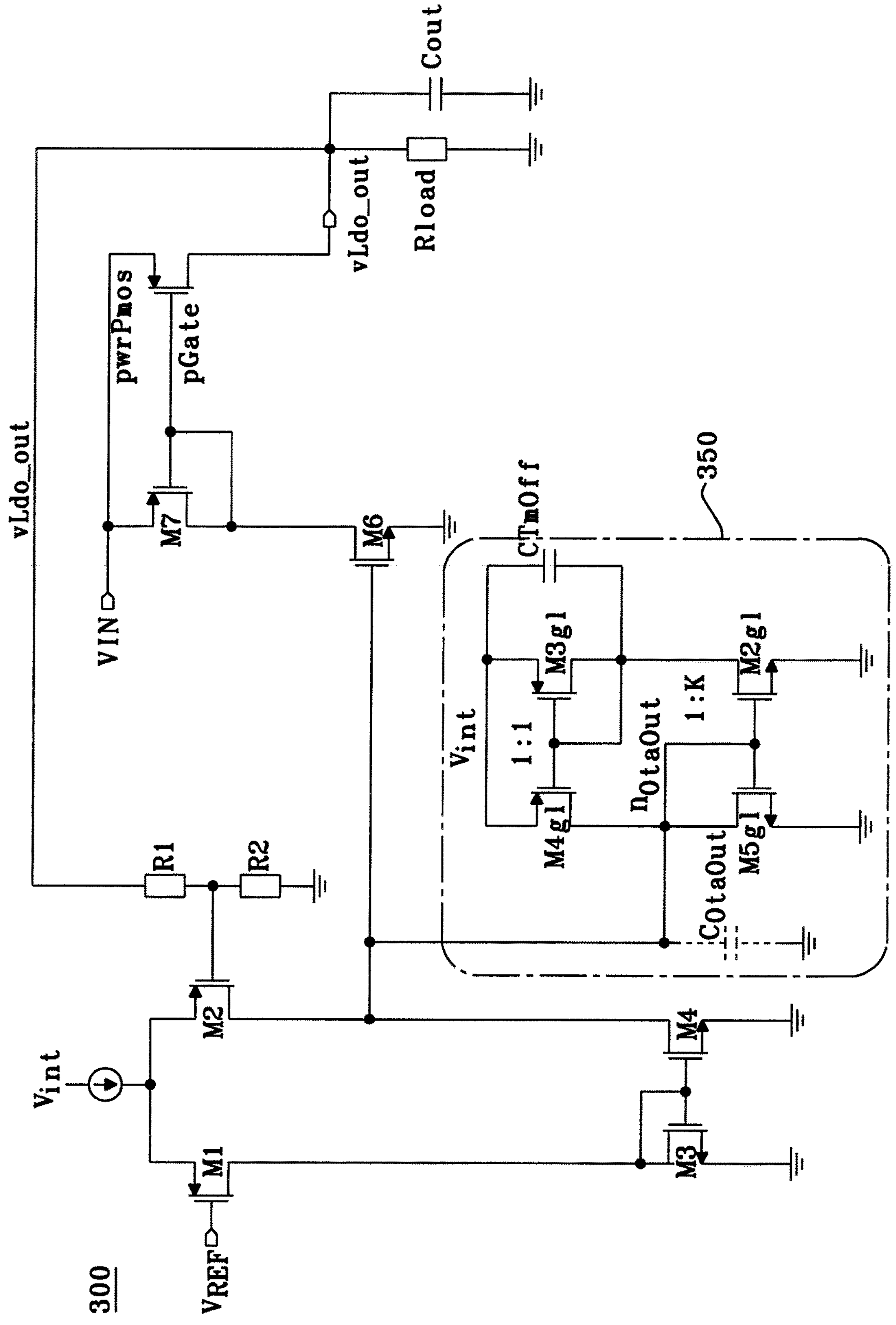

FIG. 3 schematically illustrates an example of a (complete) LDO regulator topology 300 obtained by replacing the diode-connected switch M5 of FIG. 1 with the gain limiter 305 (which is identical to the gain limiter 210 of FIG. 2A). Therefore, repeated descriptions thereof may be omitted for the sake of conciseness. Moreover, as illustrated above, if the "pMos diode" topology 220 of FIG. 2B were to be applied here, necessary adaptations of the LDO topology would have to be performed as noted above, in order to ensure proper and correct function of the entire LDO.

Notably, in some possible implementations, it may be desirable that the gain limiter topologies 210 and 220 are based on MOS switching devices, that may be able to help for almost synchronous (with load current) movement of poles and zeros over the whole load current range specified.

Figure 4A:
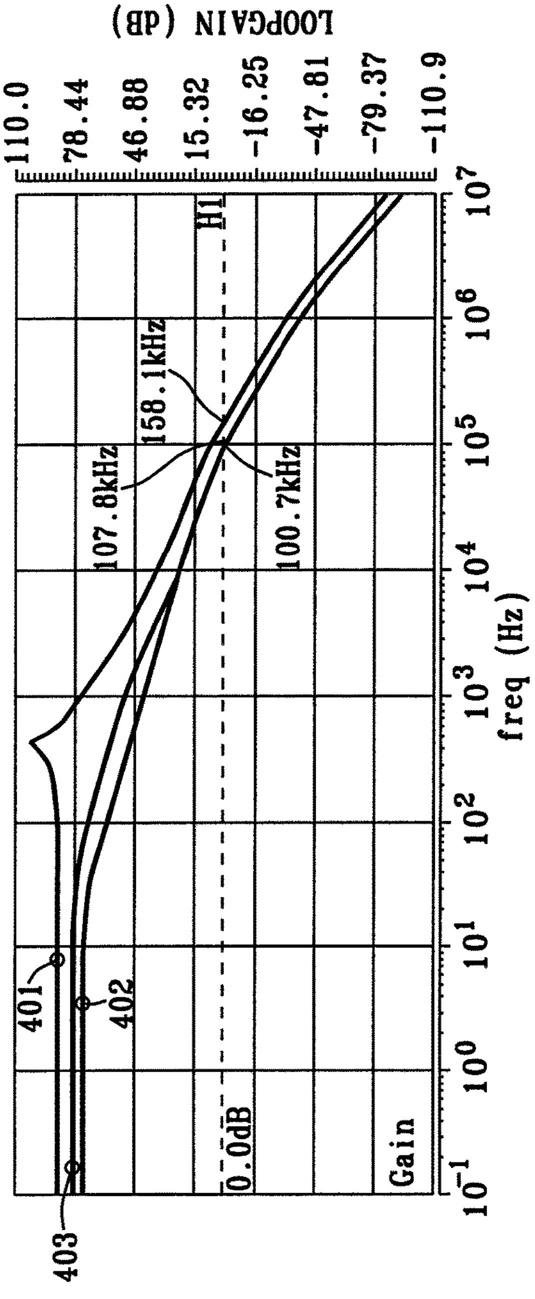
Figure 4B:
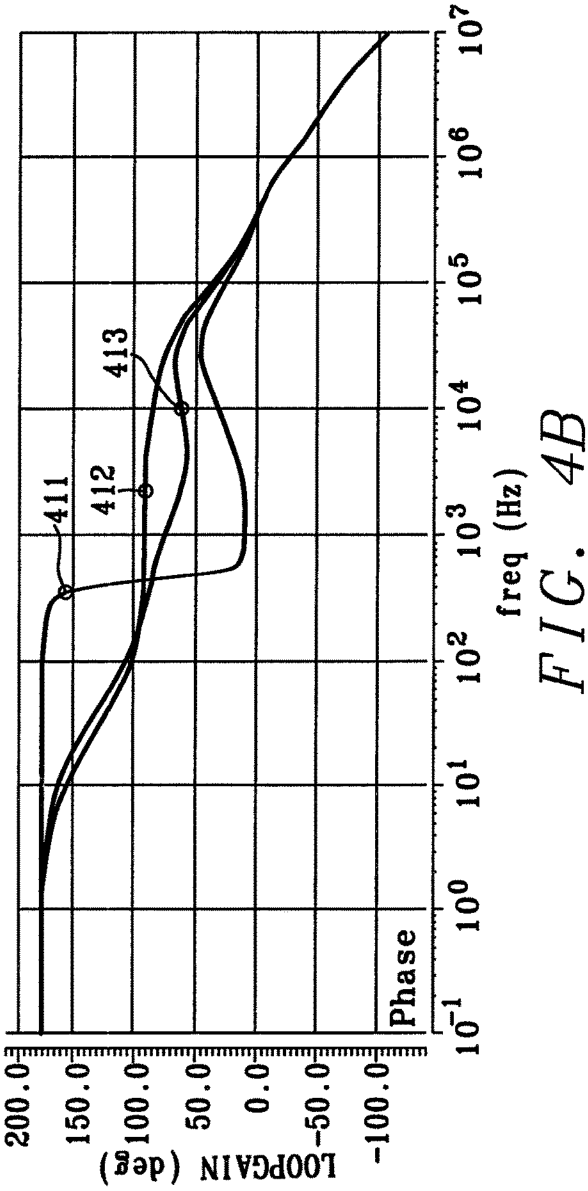

FIGS. 4A and 4B schematically illustrate an example of simulation results, in the form of Bode plots, of the LDO topologies of FIGS. 1 and 3 in comparison with that of a possible conventional LDO topology (i.e., without gain limiter). Specifically, FIG. 4A (i.e., with Bode plots 401, 402 and 403) generally relates to the gain (in dB); while FIG. 4B (i.e., with Bode plots 411, 412 and 413) generally relates to the phase (in degrees).

In particular, Bode plots 401 and 411 for the convention LDO topology without gain limiter generally exhibit maximum DC gain (as shown in plot 401 of FIG. 4A), maximum $f_{0dB}$=158 kHz, and a complex conjugate pole at about 450 Hz (as shown in plot 411 of FIG. 4B). However, it is to be noted that in this conventional implementation, even though the DC gain may be highest (approximately 87.3 dB), the corresponding phase margin of 16 degrees and the phase drop to 8 degrees may be considered unacceptable for many applications or use cases.

By contrast, Bode plots 402 and 412 for the LDO topology 100 of FIG. 1 (i.e., with diode-connected M5) generally show the lowest DC gain (of approximately 73.9 dB as shown in plot 402 of FIG. 4A), but an acceptable phase margin of approximately 35.9 degrees at the same worst case.

Moreover, Bode plots 403 and 413 for the LDO topology 300 of FIG. 3 (i.e., with the gain limiter from FIG. 2A or 2B) generally show an intermediate DC gain (of approximately 80.2 dB as shown in plot 403 of FIG. 4A) and a phase margin of approximately 35.3 degrees. Specifically, for this particular example as shown in plots 403 and 413, a value of 0.7 for the current mirror ratio K is used for the simulations. Notably, according to LDO topology 300 of FIG. 3, the exhibited DC gain increase of approximated 6 dB (about 2 times) appears to have a static load regulation meeting most of the requirements/specifications of LDO applications, yet practically with the same (or similar) phase margin as that of FIG. 1. Similar $f_{0dB}$ of approximately 101 kHz (plot 402) and 108 kHz (plot 403) are also observed for both LDO topologies of FIGS. 1 and 3, respectively. Incidentally, it is also noted that from the loop gain (in dB) shown in FIG. 4A, plots 402 and 403 seem to more or less coincide at about 10 kHz. In view thereof, it can be generally concluded that the LDO of FIG. 3 (by using the proposed gain limiter from FIG. 2A or 2B) generally shows an extra degree of freedom that would allow meeting design specifications which may not be generally achievable with the LDO topology of FIG. 1 (i.e., with diode-connected M5).

Figure 5:
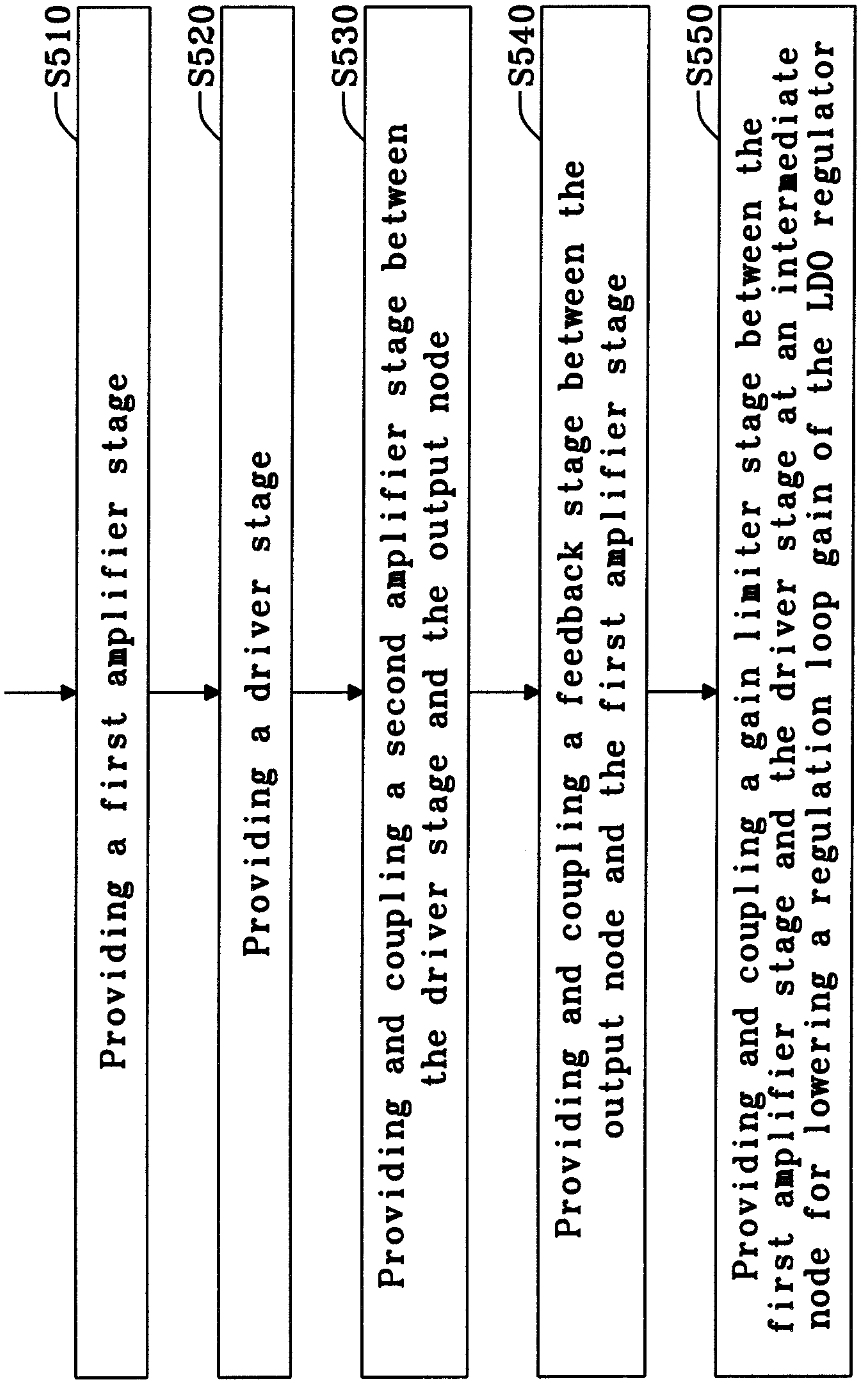
FIG. 5 is a flowchart schematically illustrating an example of a method of operating an LDO regulator according to an embodiment of the present disclosure.

Finally, FIG. 5 is a flowchart schematically illustrating an example of a method 500 of operating an LDO regulator according to an embodiment of the present disclosure. The LDO regulator may correspond to the LDO regulator 100 as shown in FIG. 1 or the LDO regulator 300 as shown in FIG. 3. The method 500 comprises, at step S510, providing a first amplifier (amplification) stage. The method 500 further comprises, at step S520, providing a driver (driving) stage. The driver stage may for example be a gate driver stage or any other suitable driver stage, depending on various implementations. The method 500 yet further comprises, at step S530, providing and/or coupling (e.g., connecting or directly coupling) a second amplifier (amplification) stage between the driver stage and the output node. As will be understood and appreciated by the skilled person, the second amplifier stage may, but does not necessarily have to be, the same (e.g., of the same kind or type) as the first amplifier stage. The method also comprises, at step S540, providing and coupling (e.g., connecting or directly coupling) a feedback stage between the output node and the first amplifier stage. Finally, the method 500 comprises, at step S550, providing and/or coupling (e.g., connecting or directly coupling) a gain limiter stage between the first amplifier stage and the driver stage at an intermediate node (i.e., the intermediate node being arranged between the first amplifier stage and the driver stage). More particularly, the gain limiter stage may be configured for lowering a regulation loop gain (or in other words, the gain of the regulation/regulating loop) of the LDO regulator. Of course, as indicated above, the LDO regulator may comprise further component(s) (e.g., elements, devices, etc.) that is/are suitable or necessary for implementing a complete LDO regulator. For instance, in some possible implementations, an output load (e.g., a resistive element) and an output capacitive element (e.g., a capacitor) may be coupled to the output node.

Configured as proposed above, the LDO regulator topologies of the present disclosure may generally allow providing LDO regulators with better LDO static load regulation (for the same phase margin), particularly for use in specific LDO designs (topologies) where an output capacitor is used for compensation. Specifically, the proposed topologies may be considered to have higher efficiency because of their simplicity, and thus may be particularly suitable in applications where high efficiency is needed. Moreover, only minimum output capacitance is generally required to achieve a stable operation. The increase of output capacitance may generally improve phase margin and overall LDO performance, which in turn would allow easy adoption in application with higher output capacitance without the necessity of re-design or re-simulation. Some of the conventional LDO topologies, by contrast, may only tolerate a certain range of output capacitance to stay stable, which in turn would make them more application-specific.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above, and/or to providing and/or arranging respective elements of these circuits.

It should further be noted that the description and drawings merely illustrate the principles of the proposed circuits and methods. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A low dropout, LDO, regulator for generating an output voltage at an output node of the LDO regulator based on an input voltage received at an input node of the LDO regulator, the LDO regulator comprising:

a first amplifier stage;

a driver stage;

a second amplifier stage coupled between the driver stage and the output node;

a feedback stage coupled between the output node and the first amplifier stage; and a gain limiter stage coupled between the first amplifier stage and the driver stage at an intermediate node for lowering a regulation loop gain of the LDO regulator, wherein the gain limiter stage comprises first and second current mirrors, wherein one branch of the first current mirror and one branch of the second current mirror are coupled to the intermediate node;

wherein the gain limiter stage further comprises a capacitive element coupled in parallel with a diode-connected switching element of the first current mirror; and wherein a capacitance of the capacitive element is set such that a current of a diode-connected switching element of the second current mirror is partially or fully compensated at low frequency, and/or is not, or is less, compensated at 0 dB gain frequency.

2. The LDO regulator according to claim 1, wherein the first amplifier stage comprises an operational transconductance amplifier, OTA.

3. The LDO regulator according to claim 1, wherein the first amplifier stage is configured to amplify a difference between a reference voltage and a voltage indicative of the output voltage.

4. The LDO regulator according to claim 3, wherein the amplified difference is for adjusting an output current of the second amplifier stage through the driver stage.

5. The LDO regulator according to claim 1, wherein the driver stage comprises first and second switching elements coupled in series between the input node and a reference node.

6. The LDO regulator according to claim 1, wherein the second amplifier stage comprises a power switching element that is supplied by the input voltage at the input node.

7. The LDO regulator according to claim 5, wherein the first switching element of the driver stage and the power switching element of the second amplifier stage form a current mirror.

8. The LDO regulator according to claim 1, wherein the feedback stage comprises a voltage divider.

9. The LDO regulator according to claim 1, wherein the gain limiter stage comprises a diode-connected switching element.

10. The LDO regulator according to claim 1, wherein the first current mirror has a current mirror ratio of 1, and the second current mirror has a current mirror ratio of K, where $0<K\leq 1$.

11. The LDO regulator according to claim 1, wherein the gain limiter stage is configured to lower an effective impedance at the intermediate node such that a non-dominant pole frequency of the LDO regulator is increased.

12. The LDO regulator according to claim 1, wherein the gain limiter stage is configured to increase a load current such that 0 dB gain frequency is also increased with the load current.

13. A gain limiter for use in a low dropout, LDO, regulator, wherein the gain limiter comprises first and second current mirrors;

wherein one branch of the first current mirror and one branch of the second current mirror are coupled to an intermediate node between a first amplifier stage and a driver stage of the LDO regulator; and wherein the gain limiter is configured for lowering a regulation loop gain of the LDO regulator;

wherein the gain limiter stage further comprises a capacitive element coupled in parallel with a diode-connected switching element of the first current mirror; and wherein a capacitance of the capacitive element is set such that a current of a diode-connected switching element of the second current mirror is partially or fully compensated at low frequency, and/or is not, or is less, compensated at 0 dB gain frequency.

14. The gain limiter according to claim 13, wherein the first current mirror has a current mirror ratio of 1, and the second current mirror has a current mirror ratio of K, where $0<K\leq 1$.

15. A method for operating a low dropout, LDO, regulator configured for generating an output voltage at an output node of the LDO regulator based on an input voltage received at an input node of the LDO regulator, the method comprising:

providing a first amplifier stage;

providing a driver stage;

providing and coupling a second amplifier stage between the driver stage and the output node;

providing and coupling a feedback stage between the output node and the first amplifier stage; and providing and coupling a gain limiter stage between the first amplifier stage and the driver stage at an intermediate node for lowering a regulation loop gain of the LDO regulator, wherein the gain limiter stage comprises first and second current mirrors, wherein one branch of the first current mirror and one branch of the second current mirror are coupled to the intermediate node;

wherein the gain limiter stage further comprises a capacitive element coupled in parallel with a diode-connected switching element of the first current mirror; and wherein a capacitance of the capacitive element is set such that a current of a diode-connected switching element of the second current mirror is partially or fully compensated at low frequency, and/or is not, or is less, compensated at 0 dB gain frequency.

16. The method according to claim 15, further comprising:

generating an output voltage at an output node of the LDO regulator based on an input voltage received at an input node of the LDO regulator;

amplifying a difference between a reference voltage and a feedback voltage indicative of the output voltage for adjusting an output current of the LDO regulator; and limiting a regulation loop gain of the LDO regulator.

* * * * *